Patented May 29, 1934

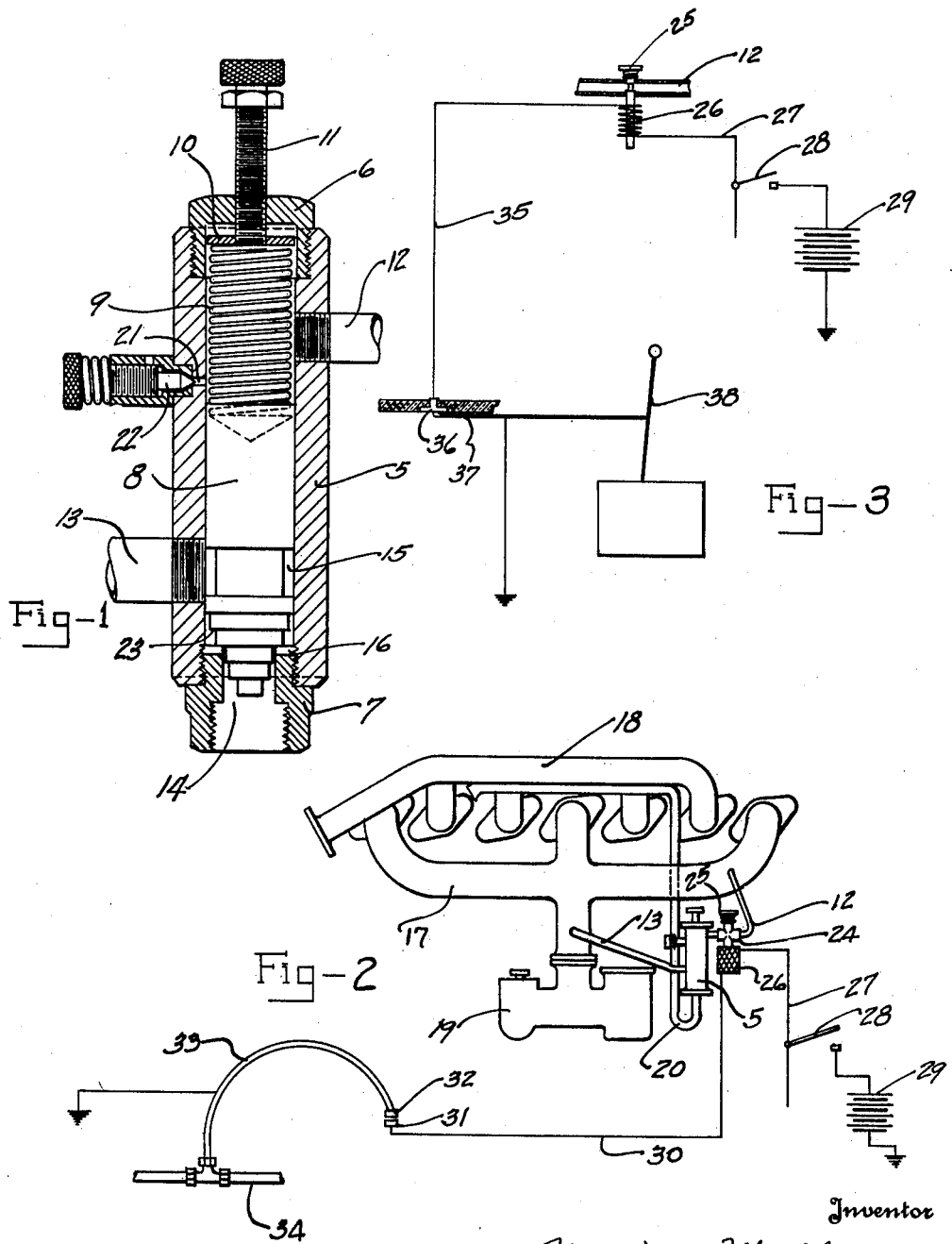

1,960,746

UNITED STATES PATENT OFFICE 1,960,746

AIR INLET DEVICE FOR AUTOMOBILE MOTORS

Marion Mallory, Toledo, Ohio, assignor to The Mallory Research Company, Toledo, Ohio, a corporation of Delaware Application May 7, 1931, Serial No. 535,601

4 Claims. (Cl. 123—124)

This invention relates to an air inlet device for automobile motors, and particularly to a valve which is adapted, under certain conditions, to be controlled in accordance with the degree of vacuum in the intake manifold to admit air to the latter.

When the usual internal combustion motor is operating at high speed, for example, with the throttle partly closed, it increases the degree of vacuum in the intake manifold, which has a retarding or braking effect upon the motor during the intake stroke of the piston, decreases the compression and also causes an unnecessarily high percentage of gasoline to be drawn into the mixing chamber.

An important object of the present invention is to provide an improved air inlet valve which is associated with the intake manifold in such a manner as to relieve the objectionable conditions referred to, thereby increasing the compression in the cylinders at high speed, at the same time conserving gasoline, and permitting the motor to run more freely when under a light load or when the automobile is coasting.

A further object of the invention is to provide an air inlet valve which will, without fluttering, respond readily to predetermined vacuum conditions in the intake manifold. It is also desirable to provide means for rendering the air inlet valve inoperative when the motor is operating at a low speed.

The above and other objects and advantages of the invention will be more particularly explained in connection with the accompanying drawing, in which—

Figure 1 is a central longitudinal section of a valve casing containing a valve constructed in accordance with the invention;

Figure 2 is a diagrammatic view illustrating one adaptation of the invention in connection with an automobile motor; and Figure 3 is a diagrammatic view illustrating another adaptation of the invention.

As illustrated in the drawing, the construction to which the invention relates comprises a valve casing 5 which, in the present instance, is in the form of a cylinder having a head 6 at its upper end and a bushing 7 at its lower end. Within the casing 5, is a valve 8 in the form of a piston which seats on the bushing 7 and is normally held seated by a coil spring 9 which acts between the upper end of the piston and a seat 10 which is adjustable by means of a screw 11 to vary the tension of the spring.

The upper part of the cylindrical casing 5 is adapted to communicate through a connection 12 with a source of suction, as for example, the intake manifold of an automobile motor and the lower part of the casing 5 has another connection 13, normally closed by valve 8, but adapted to be opened to an air supply through the port 14 of the bushing 7, when the valve 8 is raised. The valve 8 is preferably formed with a circumferential channel 15 adjacent the connection 13 to prevent the valve from sticking when suction is applied through the connection 13. The valve seat on the inner end of the bushing 7 should also be formed with notches as indicated at 16, since otherwise the leakage around the lower end of the valve would cause the suction through the connection 13 to draw air from beneath the valve, thereby causing the valve to stick to the seat.

As illustrated in Figure 2, the valve 8 and valve casing 5 are associated with an automobile motor having an intake manifold 17, exhaust manifold 18 and carburetor 19. The upper end of the casing 5 is normally in communication with the intake manifold 17 through the connection 12, while the valve controlled connection 13 leads also to the manifold 17. The conduits 12 and 13 are connected with the manifold 17 at a distance from each other, the conduit 13 being connected preferably just above the throttle 12. When the valve 8 is raised under influence of the vacuum in the manifold, air is admitted to the manifold through the inlet 14 and conduit 13. The inlet 14 may be connected with a pipe 20 leading from the region of the exhaust manifold 18 so that the air supplied to the conduit 13 will be warm. If preferred, the pipe 20 may be connected to the breather pipe leading from the crank case so that the air supplied therethrough will not only be warm but will contain oil vapor sufficient to provide lubrication for the valve.

In order that the valve 8 may not open or have a tendency to flutter when the motor is operating at low speed, that is, when the pulsations of the motor are of comparatively low frequency, the valve 8 is made quite heavy and also a bleed hole 21 is provided in the side of the casing 5 just above the valve 8 when the latter is closed. The effective size of the bleed hole 21 is determined by an adjustable needle valve 22. Thus, when the pulsations of the motor are of low frequency, the suction produced thereby through the conduit 12 will be sufficiently relieved through the bleed hole 21 to prevent the valve 8 from rising or fluttering. As the pulsations become more frequent, however, the valve 8 is raised by suction in opposition to the spring 9. The bleed hole 21 will be at once closed and the valve 8 will thereupon be held steadily in open position until the degree of vacuum in the intake manifold is considerably reduced.

In order to further facilitate the opening of the valve 8, after the motor has reached a predetermined speed, the lower end of the valve is provided with a series of steps 23. As soon as the valve is raised sufficiently to permit air to flow into the conduit 13, the current thus produced will strike against the successive steps 23 and will further increase the tendency of the valve 8 to rise. Thus the valve 8 will remain open and air will continue to be admitted through the conduit 13 into the intake manifold until such time as the speed of the motor has been considerably reduced.

In order to render the valve 8 inoperative under certain conditions when it is undesirable to relieve the vacuum in the manifold, there may be interposed in the conduit 12 a fitting 24 in which there is disposed a valve 25 which is normally open but is adapted to be closed by a solenoid 26 when the latter is energized. One terminal of the solenoid 26 is connected by a conductor 27 to the ignition circuit and through the ignition switch 28 to the positive terminal of the battery 29.

As applied in Figure 2 the other terminal of the solenoid 26 is connected by a conductor 30 to an insulated stationary contact 31. Opposed to the contact 31 is a movable contact 32 on the end of a Bourdon tube 33 which is in communication with the oil pressure line 34. Thus when the ignition switch 28 is closed and the motor is idling, current flows from the battery 29 through switch 28, conductor 27, solenoid 26, conductor 30, contacts 31 and 32, and thence through ground to the negative terminal of the battery. The solenoid, thus energized, closes the valve 25 and prevents the operation of the air inlet valve 8 until the speed of the motor increases sufficiently to cause the oil pressure to open the contacts 31 and 32. At such speed, therefore, the valve 8 will be operable under the influence of vacuum in the manifold to admit air to the latter.

In the adaptation shown in Figure 3, the negative terminal of the solenoid 26 is connected by a conductor 35 to an insulated stationary contact 36. Opposed to the stationary contact 36 is a movable grounded contact 37 which is connected with the gear shift lever 38 in such a manner that when the gears are in neutral the circuit through the contacts 36 and 37 will be closed, but when the lever 38 is shifted to gear engaging position the contact will be broken. With this arrangement, whenever the motor is idling, with the gears in neutral position, the valve 25 will be closed. This arrangement is desirable, since in the usual motor, when it is idling, barely enough gas is supplied to prevent it from stopping.

It will be understood that the various adaptations of the invention herein shown are merely for the purpose of illustration and that the invention is not limited thereto. It will also be apparent that the details of the valve structure and the parts associated therewith may be considerably modified without departing materially from the scope of the invention as claimed.

What I claim is:

1. The combination with the intake manifold of an automobile motor, of a valve operable by suction from the manifold to admit air to the latter, a solenoid control, operable when the solenoid is energized, to cut off said valve from the influence of said suction, and means to interrupt the circuit through the solenoid only when the oil pressure in the lubricating system of the motor reaches a predetermined point.

2. The combination with the intake manifold of an automobile motor, of a valve operable by suction from the manifold to admit air to the latter, a solenoid control, operable when the solenoid is energized, to cut off said valve from the influence of said suction, and means to close the circuit through the solenoid only when the automobile transmission is in neutral position.

3. The combination with the intake manifold of an automobile motor, of an air intake passageway leading to said manifold, a valve normally closing said passageway, the position of said valve being uninfluenced by variations of pressure in said passageway, a second passageway which leads to a point in said manifold remote from the first mentioned passageway and through which suction may be exerted to open said valve, an electric circuit which is open when the automobile is being driven normally, means for closing said circuit by a change to normal idling conditions, and means rendered effective by the closing of said circuit to close said second passageway.

4. The combination with the intake manifold of an automobile motor, of a valve operable by suction from the manifold to admit air to the latter, a solenoid control, operable when the solenoid is energized, to cut off said valve from the influence of said suction, an electric circuit through said solenoid which is open whenever the automobile is being driven normally, and means for closing said circuit by a change to normal idling conditions.

MARION MALLORY.